United States Patent
Onishi

(10) Patent No.: US 10,518,349 B2
(45) Date of Patent: Dec. 31, 2019

(54) WELDING DEVICE AND WELDING METHOD

(71) Applicant: Kenji Onishi, Toyota (JP)

(72) Inventor: Kenji Onishi, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 707 days.

(21) Appl. No.: 14/760,668

(22) PCT Filed: Feb. 3, 2014

(86) PCT No.: PCT/IB2014/000098
§ 371 (c)(1),
(2) Date: Jul. 13, 2015

(87) PCT Pub. No.: WO2014/122516
PCT Pub. Date: Aug. 14, 2014

(65) Prior Publication Data
US 2015/0352654 A1  Dec. 10, 2015

(30) Foreign Application Priority Data

Feb. 6, 2013 (JP) ................................. 2013-021344
Dec. 25, 2013 (JP) ................................. 2013-267563

(51) Int. Cl.
| | |
|---|---|
| *B23K 11/00* | (2006.01) |
| *B23K 9/095* | (2006.01) |
| *B23K 9/10* | (2006.01) |
| *F16P 3/16* | (2006.01) |
| *B23K 11/11* | (2006.01) |
| *B23K 37/00* | (2006.01) |
| *F16P 3/12* | (2006.01) |

(52) U.S. Cl.
CPC ............ *B23K 9/095* (2013.01); *B23K 9/1006* (2013.01); *B23K 11/115* (2013.01); *B23K 37/006* (2013.01); *F16P 3/12* (2013.01); *F16P 3/16* (2013.01)

(58) Field of Classification Search
CPC .......... B23K 11/16; B23K 11/12; B23K 11/00
USPC ........... 219/76.1, 86.22, 86.33, 86.41, 86.51, 219/86.61
See application file for complete search history.

(56) References Cited

U.S. PATENT DOCUMENTS 4,041,272 A     8/1977   Burton et al.
4,060,160 A *  11/1977   Lieber ...................... F16P 3/16
                                                              192/130

(Continued)

FOREIGN PATENT DOCUMENTS

JP     S61-206577 A     9/1986
JP     S61-283469 A    12/1986

(Continued)

*Primary Examiner* — Dana Ross
*Assistant Examiner* — Ayub A Maye
(74) *Attorney, Agent, or Firm* — Oliff PLC

(57) ABSTRACT

A first electrode and a second electrode carry out welding in cooperation with each other. A power supply applies a first voltage between the first electrode and the second electrode. A control device controls whether to carry out welding on a first object on the basis of information that varies with a material of the first object and that has been detected in a state where the first object is in contact with the first electrode and the second electrode.

2 Claims, 11 Drawing Sheets

(56) References Cited

U.S. PATENT DOCUMENTS

| | | | | |
|---|---|---|---|---|
| 4,463,243 A * | 7/1984 | Church | ................ | B23K 35/383 |
| | | | | 219/74 |
| 4,631,383 A * | 12/1986 | Haggett | ................ | B23K 11/36 |
| | | | | 192/134 |
| 5,484,986 A * | 1/1996 | Fantazian | .............. | B23K 11/31 |
| | | | | 219/86.41 |
| 5,558,785 A * | 9/1996 | Killian | ................ | B23K 11/253 |
| | | | | 219/110 |
| 5,592,733 A * | 1/1997 | Wareham | ................ | B21J 15/28 |
| | | | | 192/132 |
| 6,018,729 A * | 1/2000 | Zacharia | .............. | G05B 13/027 |
| | | | | 219/110 |
| 2012/0000567 A1* | 1/2012 | Sakamoto | ............... | B21C 37/08 |
| | | | | 138/177 |

FOREIGN PATENT DOCUMENTS

| | | | |
|---|---|---|---|
| JP | H06-142944 | A | 5/1994 |
| JP | 2001170777 | A * | 6/2001 |
| JP | 2002-205174 | A | 7/2002 |
| JP | 2004-001066 | A | 1/2004 |
| JP | 2005-125392 | A | 5/2005 |
| WO | 2007/079041 | A2 | 7/2007 |

\* cited by examiner

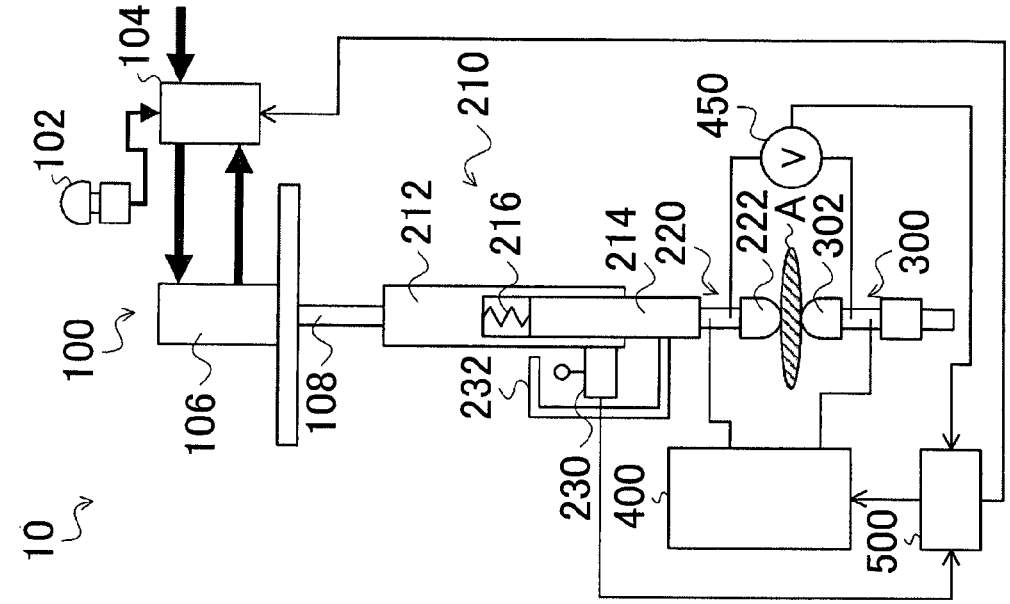
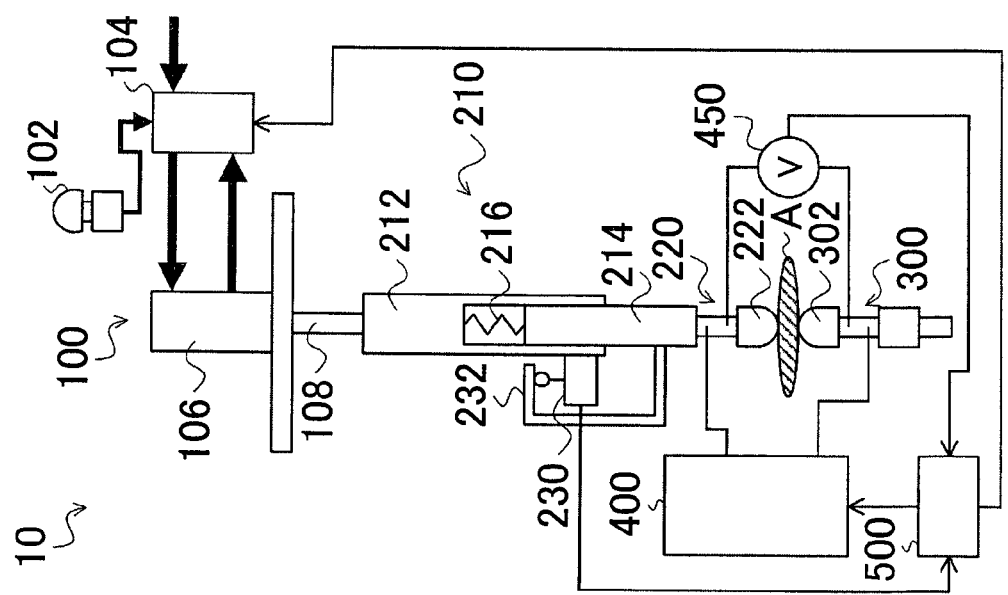

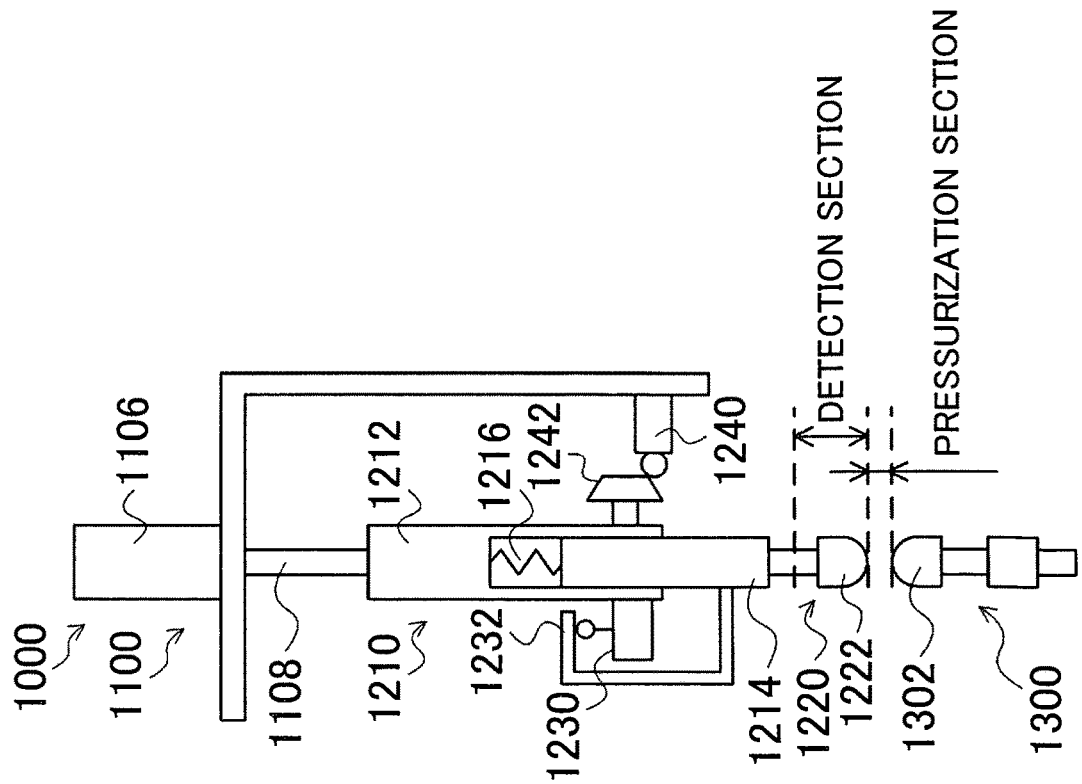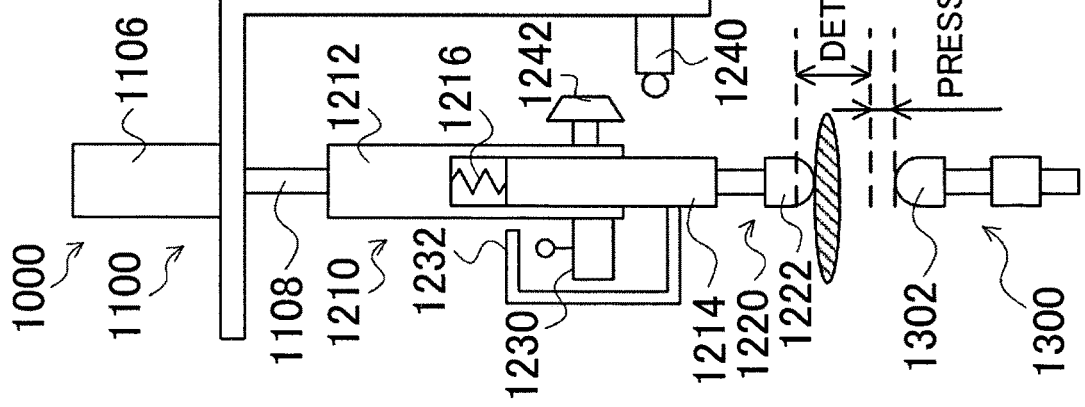

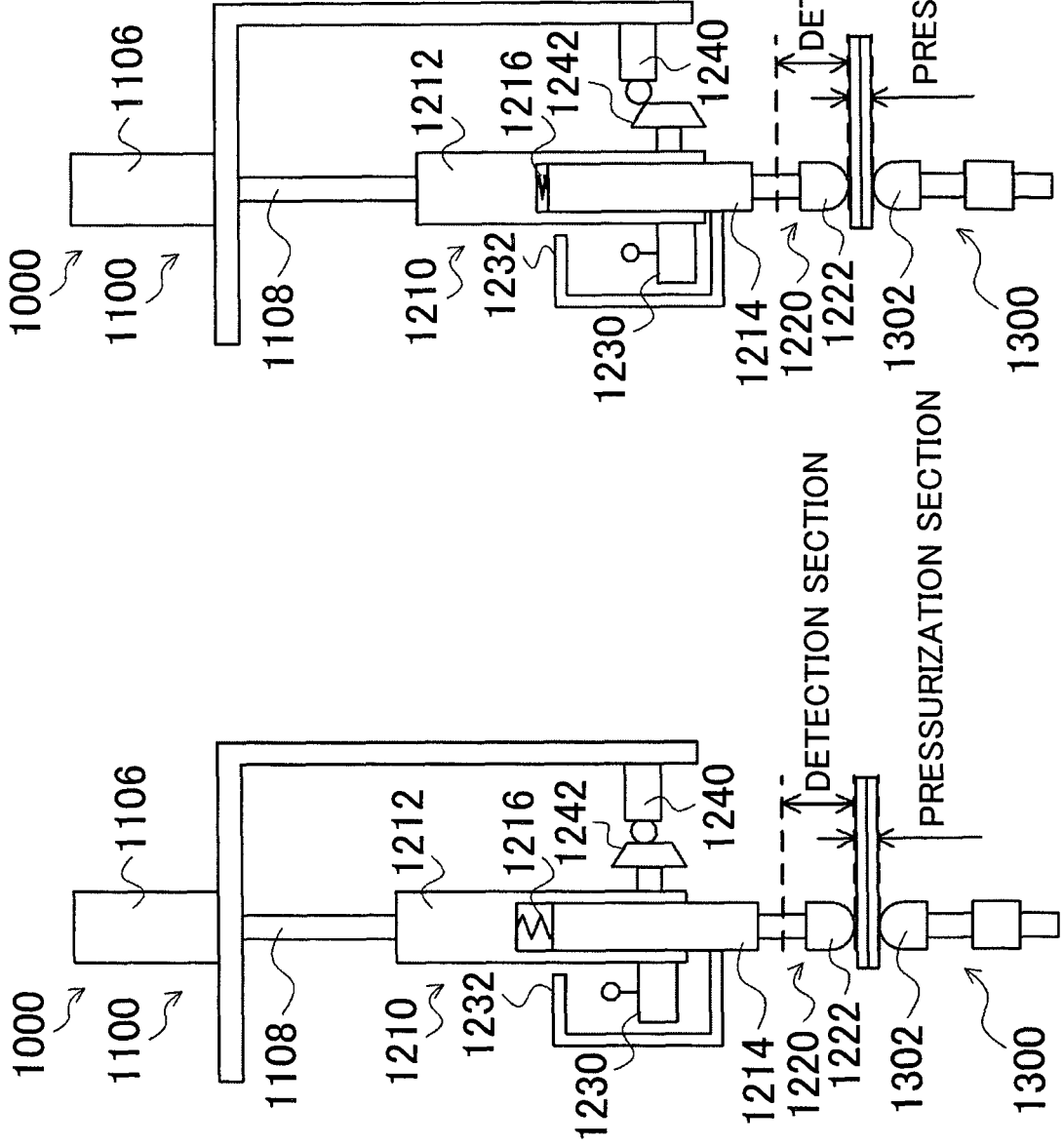

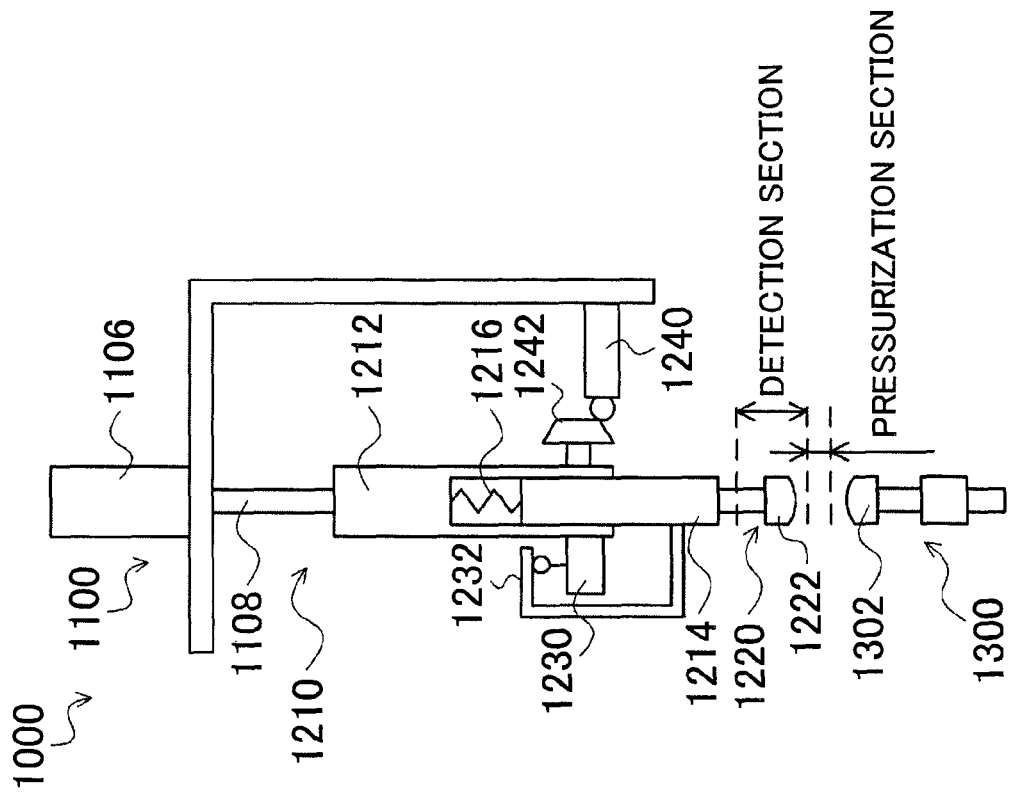
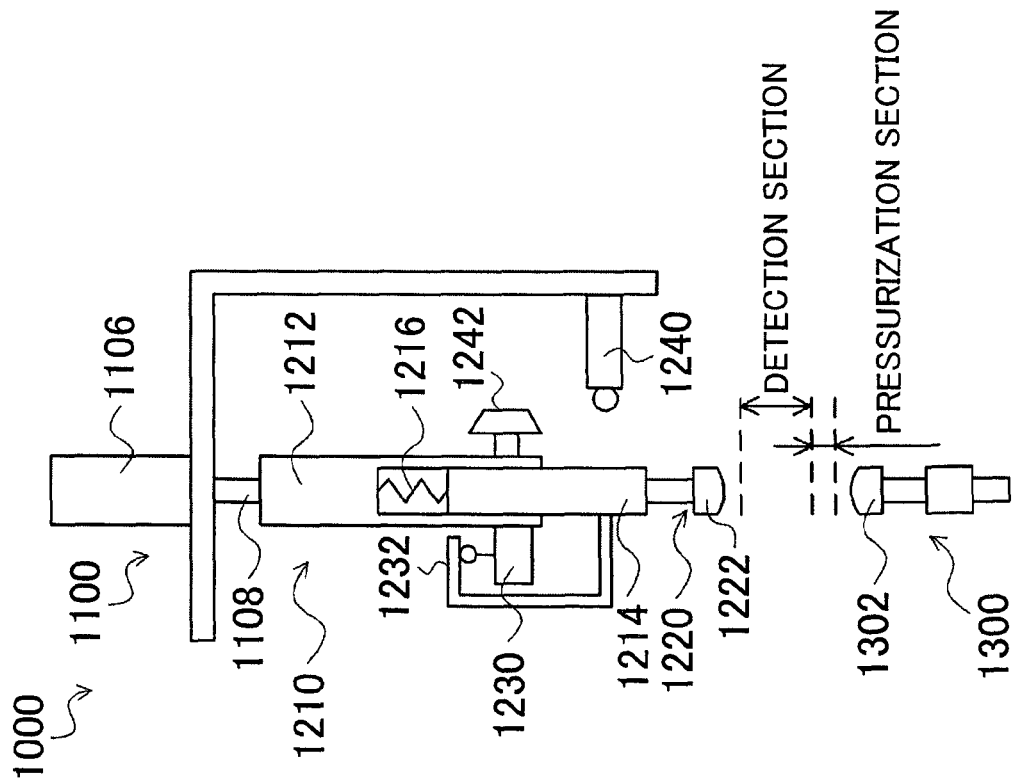

WELDING DEVICE AND WELDING METHOD

BACKGROUND OF THE INVENTION

1. Field of the Invention

The invention relates to a welding device and a welding method and, more particularly, to a welding device and a welding method for welding with the use of electrodes.

2. Description of Related Art

For example, spot welding is carried out as a method of joining two or more steel sheets. Sport welding is carried out as follows. First, two or more stacked steel sheets are sandwiched at a high pressing force (for example, about several thousands of newtons) with the use of, for example, two copper electrodes (welding tips), and a current (for example, several thousands to several tens of thousands of amperes) is flowed, between the electrodes. After that, resistance heat arises due to the current flowing through the steel sheets, and the stacked steel sheets are welded together as the steel sheets are melted by the resistance heat.

When a worker has erroneously sandwiched an object other than a welding target, such as a worker's finger, between the two electrodes at the time of welding, a method of detecting the fact that the object other than the welding target has been caught in is introduced. For example, there is a method of detecting the fact that an object other than a welding target has been caught in on the basis of the position of the electrodes. Specifically, it is a, method in which it is determined that it is abnormal when a displacement by which a movable electrode has moved until the movable electrode contacts the welding target is small and then the electrodes are released.

Japanese Patent Application Publication No. 61-283469 (JP 61-283469 A) describes a lower electrode consumption state determination device of a stationary spot welding machine, which includes a current detector for detecting a welding current flowing through a lower fixed electrode and a determination circuit that measures a welding current value and an energization time on the basis of an output of the current detector and informs that welding is inappropriate when any one of the welding current value and the energization time is smaller than a corresponding one of comparison reference values by comparing both measured values with the corresponding reference values.

When spot welding is repeatedly carried out, the distal ends of the electrodes abrade. Thus, as described above, with the method of detecting the fact that an object other than the welding target has been caught in on the basis of the displacement of the movable electrode, that is, the position of the movable electrode, for example, it may not be able to correctly determine whether an object other than the welding target has been caught in when the electrodes have abraded.

SUMMARY OF THE INVENTION

The invention provides a welding device and a welding method that are able to determine whether an object with which electrodes are in contact is a welding target irrespective of a position of the electrodes.

A first aspect of the invention provides a welding device. The welding device includes: a first electrode and a second electrode that are configured to carry out welding in cooperation with each other; and a control device configured to control whether to carry out welding on a first object on the basis of information that varies with a material of the first object and that has been detected in a state where the first object is in contact with the first electrode and the second electrode.

The first aspect may further include a power supply configured to apply a first voltage between the first electrode and the second electrode, and the control device may be configured to control whether to carry out welding on the first object on the basis of an electrical conduction state between the first electrode and the second electrode in a state where the first object is in contact with the first electrode and the second electrode and the first voltage is applied.

The first aspect may further include a potential difference detection unit configured to detect a potential difference between the first electrode and the second Zelectrode due to the first voltage applied by the power supply in a state where the first electrode and the second electrode are in contact with the first object, and the control device may be configured to control whether to carry out welding on the first object on the basis of whether the potential difference is larger than a predetermined first value.

In the above aspect, the control device may be configured to determine that the first object is not a welding target when the potential difference is larger than the first value and execute control such that welding is not carried out on the first object. The control device may be configured to determine that the first object is a welding target when the potential difference is smaller than or equal to the first value and execute control such that welding is carried out on the first object.

The control device may be configured to execute control such that the power supply applies the first voltage after both the first electrode and the second electrode contact the first object. The control device may be configured to execute control such that the power supply applies the first voltage before both the first electrode and the second electrode contact the first object. The first voltage may be lower than a second voltage that is applied between the first electrode and the second electrode at the time of welding.

In the first aspect, the control device may be configured to control whether to carry out welding on the first object on the basis of information that varies with a hardness of the first object and that has been detected in a state where the first object is in contact with the first electrode and the second electrode. The first aspect may further include a vibration detecting unit installed near the second electrode and configured to detect vibration information in a state where the first electrode and the second electrode are in contact with the first object, the first electrode may be a movable electrode, the second electrode may be a fixed electrode, and the control device may be configured to control whether to carry out welding on the first object on the basis of the vibration information detected by the vibration detecting unit.

A second aspect of the invention provides a welding method that uses a welding device that has a first electrode and a second electrode that are configured to carry out welding in cooperation with each other. The welding method includes: detecting information that varies with a material of a first object in a state where the first object is in contact with the first electrode and the second electrode; and controlling whether to carry out welding on the first object on the basis of the detected information.

The second aspect may further include applying a first voltage between the first electrode and the second electrode, and, in controlling whether to carry out welding on the first object, whether to carry out welding on the first object may be controlled on the basis of an electrical conduction state between the first electrode and the second electrode in a state where the first object is in contact with the first electrode and the second electrode and the first voltage is applied.

In the above aspect, in controlling whether to carry out welding on the first object, whether to carry out welding on the first object may be controlled on the basis of information that varies with a hardness of the first object and that has been detected in a state where the first object is in contact with the first electrode and the second electrode.

According to the invention, it is possible to provide the welding device and the welding method that are able to determine whether an object with which electrodes are in contact is a welding target irrespective of a position of the electrodes.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A and FIG. 4B are views that show the operation of the welding device according to the first embodiment;

FIG. 9A to FIG. 9D are views that show the operation of the welding device according to the comparative embodiment; and FIG. 10A and FIG. 10B are views that show the operation of the welding device according to the comparative embodiment.

DETAILED DESCRIPTION OF EMBODIMENTS

Outline of Embodiment

Figure 1:
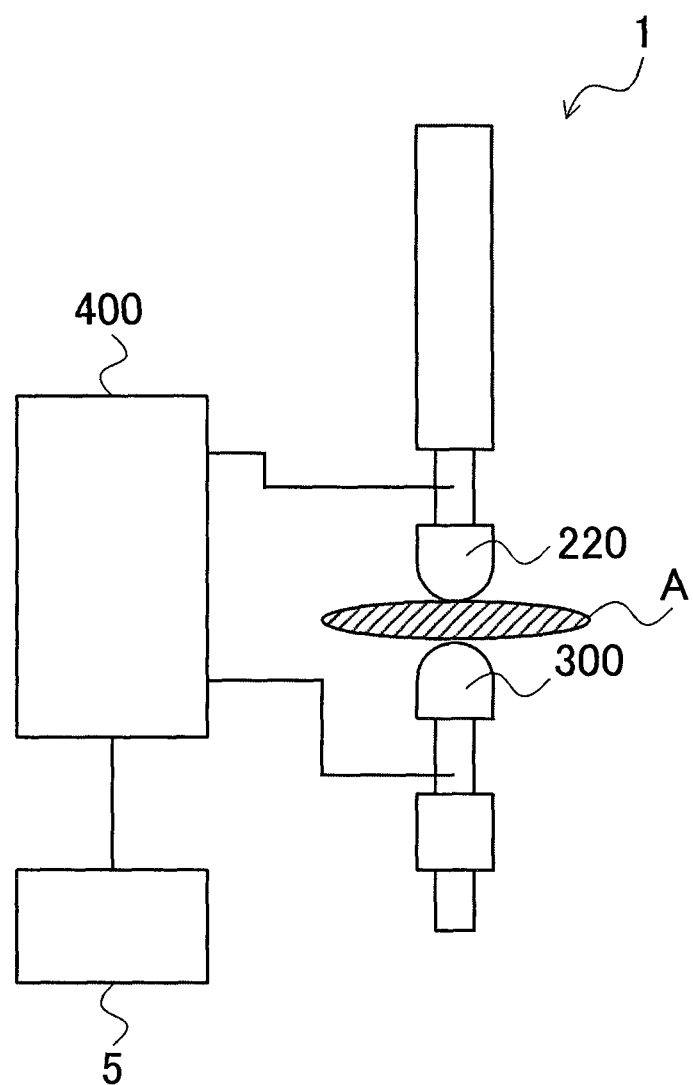
FIG. 1 is a view that shows the outline of a welding device according to an outline of an embodiment of the invention.

In advance of description of an embodiment, the outline of the present embodiment will be described with reference to FIG. 1. As shown in FIG. 1, a welding device 1 is formed of a movable electrode (first electrode) 220, a fixed electrode (second electrode) 300, a power supply 400 and a control device 5.

The movable electrode (first electrode) 220 and the fixed electrode (second electrode) 300 carry out welding in cooperation with each other. The power supply 400 applies a first voltage between the movable electrode (first electrode) 220 and the fixed electrode (second electrode) 300. The control device 5 determines whether to carry out welding on an object A (first object) on the basis of information that varies with a material of the object A (first object) and that has been detected in a state where the object A (first object) is in contact with the movable electrode (first electrode) 220 and the fixed electrode (second electrode) 300. Here, the "infor-mation that varies with the material" is information that varies on the basis of whether the object A is a welding target (for example, steel sheets) or a non-welding target (for example, a finger). That is, the material of the welding target is different from the material of the non-welding target. Specific examples will be described below.

Specifically, as a first example, the control device 5 controls whether to carry out welding on the object A (first object) on the basis of an electrical conduction state between the movable electrode (first electrode) 220 and the fixed electrode (second electrode) 300 in a state where the object A (first object) is in contact with the movable electrode (first electrode) 220 and the fixed electrode (second electrode) 300 and the first voltage is applied. That is, in the first example, the "information that varies with the material" means "information that indicates an electrical conduction state". For example, when the object A is a welding target made of a material having a small electrical resistance, the "information that indicates the electrical conduction state" indicates that the object A is electrically conductive. On the other hand, when the object A is a non-welding target made of a material having a large electrical resistance, the "information that indicates the electrical conduction state" indicates that the object A is not electrically conductive.

As a second example, the control device 5 controls whether to carry out welding on the object A (first object) on the basis of information that varies with a hardness of the object A (first object) and that has been detected in a state where the object A (first object) is in contact with the movable electrode (first electrode) 220 and the fixed electrode (second electrode) 300. That is, in the second example, the "information that varies with the material" means the "information that varies with the hardness of the object A". For example, when the object A is a welding target, such as a steel sheet, made of a hard material, the "information that varies with the hardness of the object A" indicates that the object A is "hard". On the other hand, when the object A is a non-welding target, such as a finger, made of a soft material, the "information that varies with the hardness of the object A" indicates that the object A is. "soft". More specifically, for example, as will be described later, the "information that varies with the hardness of the object A" may be vibration information.

With the welding device 1 according to the present embodiment, it is possible to determine whether an object with which the electrodes are in contact is a welding target irrespective of the position of the electrodes. The welding target is an object that can be welded by the welding device 1, that is formed of a conductor that conducts electricity and that is made of a material having a high hardness. The welding target is, for example, an object, such as stacked steel sheets and is a target to be welded.

First Embodiment

Figure 2:
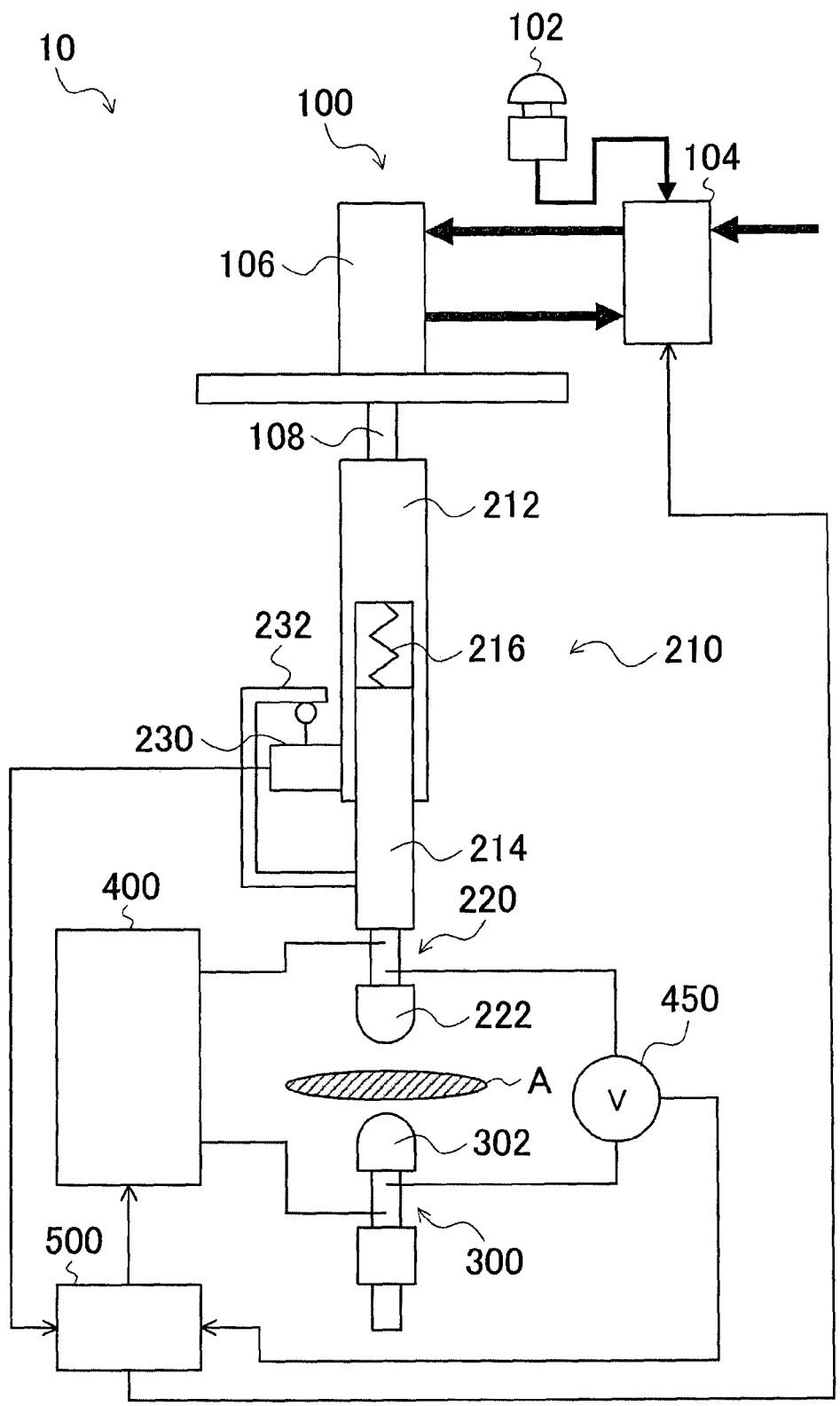
FIG. 2 is a view that shows the details of the welding device according to a first embodiment of the invention.

Hereinafter, a first embodiment will be described with reference to the drawings. FIG. 2 is a view that shows the details of the welding device 10 according to the first embodiment. The welding device 10 includes an actuating device 100, a telescopic rod 210, the movable electrode 220, the fixed electrode 300, the power supply 400, a voltmeter 450 and the control device 500. It is assumed that the welding device 10 according to the first embodiment is a device that carries out spot welding. Instead, the welding device 10 may be, for example, a device that carries out arc welding.

The actuating device 100 moves the movable electrode 220 up and down via the telescopic rod 210. The actuating device 100 includes a push button 102, an electrode moving valve 104, a cylinder 106 and a cylinder rod 108. When the push button 102 is depressed by a worker, the electrode moving valve 104 turns on. As a result, fluid, such as oil and air, is supplied to the cylinder 106. In addition, the cylinder rod 108 is pushed out by the pressure (hydraulic pressure, air pressure, or the like) of the supplied fluid, with the result the cylinder rod 108 moves forward.

The telescopic rod 210 includes a cylinder portion 212 and a rod portion 214. The rod portion 214 has a telescopic structure so as to be slidable inside the cylinder portion 212. The cylinder rod 108 is connected to an end portion of the cylinder portion 212 across from the rod portion 214. The rod portion 214 is connected to the inside of the cylinder portion 212 via an elastic member 216. When the elastic member 216 extends or contracts, the telescopic rod 210 extends or contracts. The elastic member 216 is, for example, formed of spring, rubber, or the like.

The movable electrode 220 is connected to an end portion of the rod portion 214 across from the cylinder portion 212. A welding tip 222 is provided at the distal end of the movable electrode 220. The welding tip 222 is replaceable when the welding tip 222 has abraded due to repeated welding. The fixed electrode 300 is provided at a location facing the movable electrode 220. A welding tip 302 is provided at the distal end of the fixed electrode 300. The welding tip 302 is replaceable when the welding tip 302 has abraded due to repeated welding.

As the cylinder rod 108 moves forward, the telescopic rod 210 moves downward, with the result that the movable electrode 220 moves downward. Thus, when the movable electrode 220 moves downward, the movable electrode 220 and the fixed electrode 300 sandwich the object A. After the movable electrode 220 contacts the object A, when the cylinder rod 108 further moves forward, the elastic member 216 contracts, with the result that the telescopic rod 210 also contracts. At this time, the rod portion 214 and the movable electrode 220 are urged toward the object A by the elastic force of the elastic member 216. Thus, the object A is pressurized.

A clamp detection switch 230 is provided on the side face of the cylinder portion 212. The clamp detection switch 230 is a switch for detecting the fact that the object A is sandwiched (clamped) between the movable electrode 220 and the fixed electrode 300. A dog 232 is provided on the side face of the rod portion 214. The dog 232 is formed in a substantially C shape. When the elastic member 216 is extended under the own weight of the rod portion 214, the dog 232 turns on the clamp detection switch 230. On the other hand, when the object A is sandwiched between the movable electrode 220 and the fixed electrode 300 and the telescopic rod 210 is contracted, the dog 232 moves away from the clamp detection switch 230. As a result, the clamp detection switch 230 turns off.

The power supply 400 is connected to the movable electrode 220 and the fixed electrode 300. The power supply 400 applies a voltage required for welding between the movable electrode 220 and the fixed electrode 300. Specifically, when the welding target is sandwiched between the movable electrode 220 and the fixed electrode 300, the power supply 400 applies a voltage (welding voltage; high voltage) such that, for example, current having several thousands to several tens of thousands of amperes flows between the movable electrode 220 and the fixed electrode 300.

In addition, the power supply 400 has the function as a variable transformer. Thus, the power supply 400 is able to apply a low voltage (object detection voltage), which is much lower than the welding voltage, between the movable electrode 220 and the fixed electrode 300. The object detection voltage is a voltage to such a degree that a human body is not influenced if part of the human body, such as a finger, is caught in between the movable electrode 220 and the fixed electrode 300, and is, for example, about 0.5 V to 1 V. The voltmeter 450 is connected to the movable electrode 220 and the fixed electrode 300, and measures the potential difference between the movable electrode 220 and the fixed electrode 300. The voltmeter 450 functions as a potential difference detection unit of the invention. In this way, when the power supply 400 applies both the welding voltage and the object detection voltage, another power supply is not required to be prepared for applying the object detection voltage.

When the object A sandwiched between the movable electrode 220 and the fixed electrode 300 is a welding target (that is, a conductor), the resistance value of the object A is significantly small. Thus, in this case, electrical conduction is established between the movable electrode 220 and the fixed electrode 300 via the object A. Therefore, there is almost no potential difference between the movable electrode 220 and the fixed electrode 300. Thus, the potential difference measured by the voltmeter 450 is smaller than or equal to a predetermined threshold (first value; potential difference threshold).

On the other hand, when the object A sandwiched between the movable electrode 220 and the fixed electrode 300 is an insulator (that is, not a welding target), the resistance value of the object A is significantly larger than that of a conductor. Thus, in this case, almost no electrical conduction is established between the movable electrode 220 and the fixed electrode 300 via the object A. Therefore, there occurs a potential difference between the movable electrode 220 and the fixed electrode 300. Thus, the potential difference measured by the voltmeter 450 is larger than the potential difference threshold. In this case, the object detection voltage is lower than the welding voltage, so it is possible to prevent overcurrent from flowing through the object A that is the insulator. The above-described potential difference threshold may be set to a value that is larger than the potential difference that occurs when the object A is a conductor and smaller than the potential difference that occurs when the object A is an insulator in the case where the object detection voltage is applied between the movable electrode 220 and the fixed electrode 300. The potential difference threshold may be, for example, 0.5 V.

The control device 500 corresponds to the control device 5 shown in FIG. 1. The process of the control device 500 may be, for example, implemented by hardware, such as a relay circuit that executes sequence control. The process of the control device 500 may be, for example, implemented by executing a program through control over an arithmetic processing unit (not shown) included in the control device 500 that is a computer. More specifically, the program stored in a storage medium (not shown) that is included in the control device 500 may be loaded on a memory (not shown), and the program may be implemented by executing control over the arithmetic processing unit.

The control device 500 determines whether the object A sandwiched between the movable electrode 220 and the fixed electrode 300 is a welding target. That is, the control device 500 determines whether electricity flows through the object A that is in contact with the movable electrode 220 and the fixed electrode 300 (in other words, whether electrical conduction is established between the movable electrode 220 and the fixed electrode 300 via the object A) with the use of the voltmeter 450. In addition, the control device 500 determines whether to weld the object A sandwiched between the movable electrode 220 and the fixed electrode 300 on the basis of the determination result. Specifically, description will be made with reference to FIG. 3 later.

Figure 3:
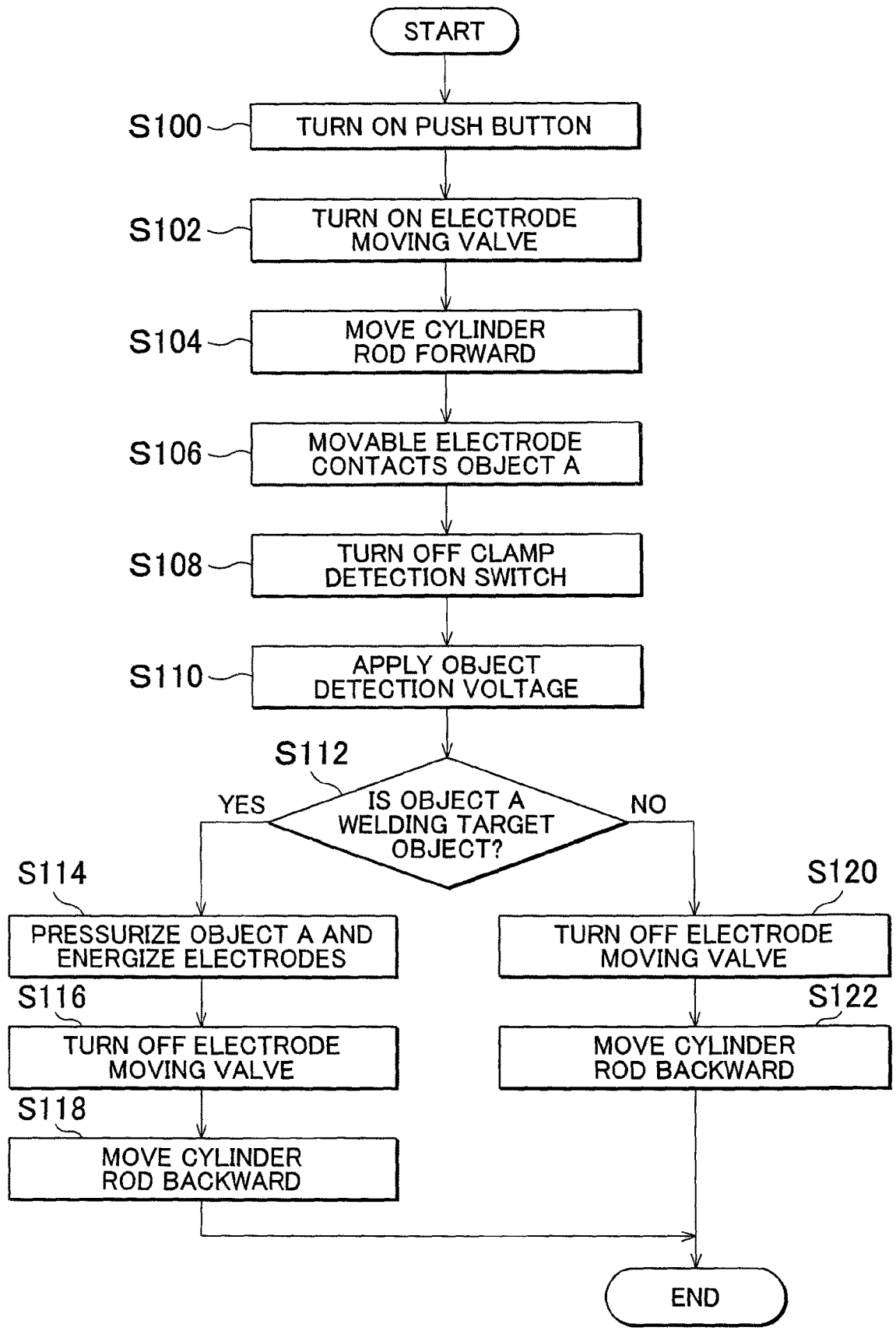
FIG. 3 is a flowchart that shows the overall processes of the welding device according to the first embodiment.

FIG. 3 is a flowchart that shows the overall processes of the welding device 10. In the flowchart shown in FIG. 3, the sequence of the processes (steps) may be changed as needed. One or more of the plurality of processes (steps) may be omitted.

When the push, button 102 is depressed by a worker, the push button 102 turns on (S100). Thus, the electrode moving valve 104 enters an on state (S102). In addition, the cylinder rod 108 moves forward by the pressure of fluid supplied by the electrode moving valve 104 (S104).

When the cylinder rod 108 moves forward, the movable electrode 220 contacts the object A as shown in FIG. 4A (S106). In addition, when the cylinder rod 108 moves forward, the elastic member 216 is compressed, the dog 232 moves away from the clamp detection switch 230 as shown in FIG. 4B, and the clamp detection switch 230 turns off (S108).

When the clamp detection switch 230 turns off, the power supply 400 applies the object detection voltage under control from the control device 500 (S110). The control device 500 determines whether the object A is a welding target (S112). Specifically, when the clamp detection switch 230 turns off, the control device 500 controls the power supply 400 such that the power supply 400 applies the object detection voltage between the movable electrode 220 and the fixed electrode 300. Thus, the power supply 400 applies the object detection voltage between the movable electrode 220 and the fixed electrode 300. In addition, the control device 500 determines whether the potential difference between the movable electrode 220 and the fixed electrode 300, measured by the voltmeter 450, is larger than or equal to the potential difference threshold. In this way, by executing the process of S110 after the process of S108, it is possible to minimize a period of time during which the object detection voltage is applied.

When the potential difference between the movable electrode 220 and the fixed electrode 300 is smaller than or equal to the potential difference threshold, the control device 500 determines that the object A is a welding target (YES in S112). In this case, the control device 500 pressurizes the object A with the use of the movable electrode 220, and further causes the power supply 400 to energize the movable electrode 220 and the fixed electrode 300 (S114). Specifically, the control device 500 controls the cylinder rod 108 so as to cause the cylinder rod 108 to further move forward (that is, keeps the electrode moving valve 104 in the on state). Thus, the elastic member 216 is further compressed, so the movable electrode 220 is pressed against the object A by the urging force of the elastic member 216. Thus, the movable electrode 220 pressurizes the object A. In addition, the control device 500 controls the power supply 400 so as to cause the power supply 400 to apply the welding voltage between the movable electrode 220 and the fixed electrode 300. With this process, welding is carried out on the object A.

When welding is complete, the control device 500 turns off the electrode moving valve 104 (S116). As a result, the fluid supplied to the cylinder 106 is drained from the cylinder 106, so the cylinder rod 108 moves backward (S118). Thus, the welding process ends.

On the other hand, when the potential difference between the movable electrode 220 and the fixed electrode 300 is larger than the potential difference threshold, the control device 500 determines that the object A is not a welding target (NO in S112). In this case, the control device 500 turns off the electrode moving valve 104 without carrying out welding on the object A (S120). As a result, the fluid supplied to the cylinder 106 is drained from the cylinder 106, so the cylinder rod 108 moves backward (S122). Thus, the welding process ends. In this way, it is possible to determine whether an object with which the movable electrode 220 is in contact is a welding target with the use of a simple method in which the potential difference between the movable electrode 220 and the fixed electrode 300 is measured.

Second Embodiment

Figure 5:
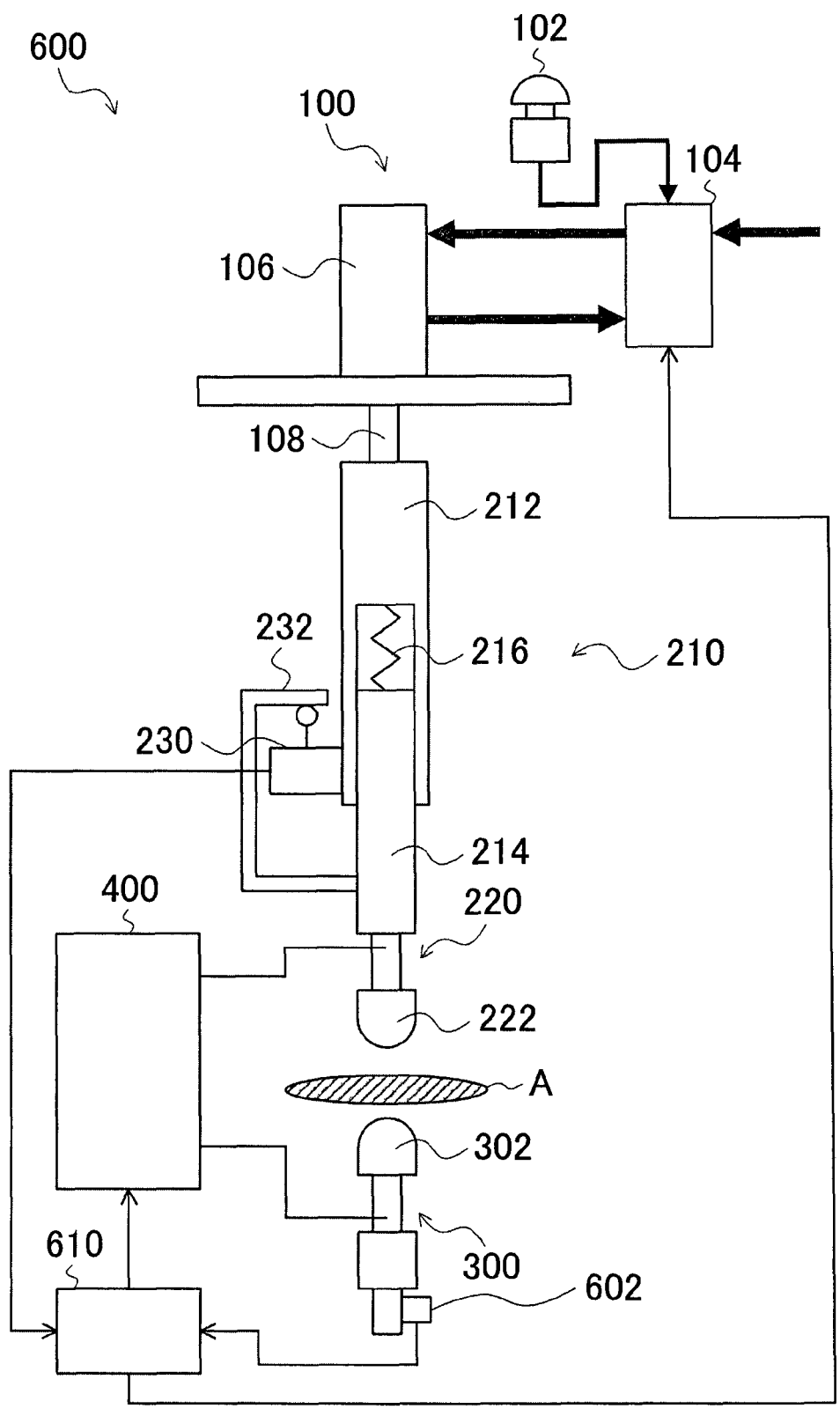
FIG. 5 is a view that shows the details of, a welding device according to a second embodiment of the invention.

Next, a second embodiment will be described. FIG. 5 is a view that shows the details of a welding device 600 according to the second embodiment. Like reference numerals denote components substantially similar to those of the first embodiment. In the welding device 600 according to the second embodiment, the voltmeter 450 in the first embodiment is not provided, and a vibration sensor 602 (vibration detecting unit) is provided instead. In the second embodiment, the control device 500 in the first embodiment is replaced with a control device 610. In the second embodiment, the power supply 400 may not have the function as a variable transformer. Components other than these are similar to those of the first embodiment, so the description is omitted.

The vibration sensor 602 (vibration detecting unit) is, for example, provided on a member that supports the fixed electrode 300. For example, the vibration sensor 602 is installed at the lower portion of the fixed electrode 300. For example, the vibration sensor 602 may be installed on a support frame (not shown) that supports the fixed electrode 300 and the welding device 600. The vibration sensor 602 detects a vibration applied to the fixed electrode 300. In addition, when the vibration sensor 602 has detected a vibration, the vibration sensor 602 transmits a detected signal indicating a vibration value (vibration information) to the control device 610.

When the object A between the movable electrode 220 and the fixed electrode 300 is the welding target, the object A is steel sheets, or the like, so the hardness of the object A is high. Therefore, when the movable electrode 220 moves downward and collides with the object A and, as a result, the object A is sandwiched between the movable electrode. 220 and the fixed electrode 300, the fixed electrode 300 vibrates by a large amount. At this time, the vibration sensor 602 detects the large vibration.

On the other hand, when the object A between the movable electrode 220 and the fixed electrode 300 is not the welding target (for example, when the object A is a worker's finger, or the like), the hardness of the object A is low. Therefore, when the movable electrode 220 moves downward and collides with the object A and, as a result, the object A is sandwiched between the movable electrode 220 and the fixed electrode 300, the fixed electrode 300 does not vibrate so much as compared to the case where the object A is the welding target. At this time, the vibration sensor 602 detects the small vibration.

Figure 6A:
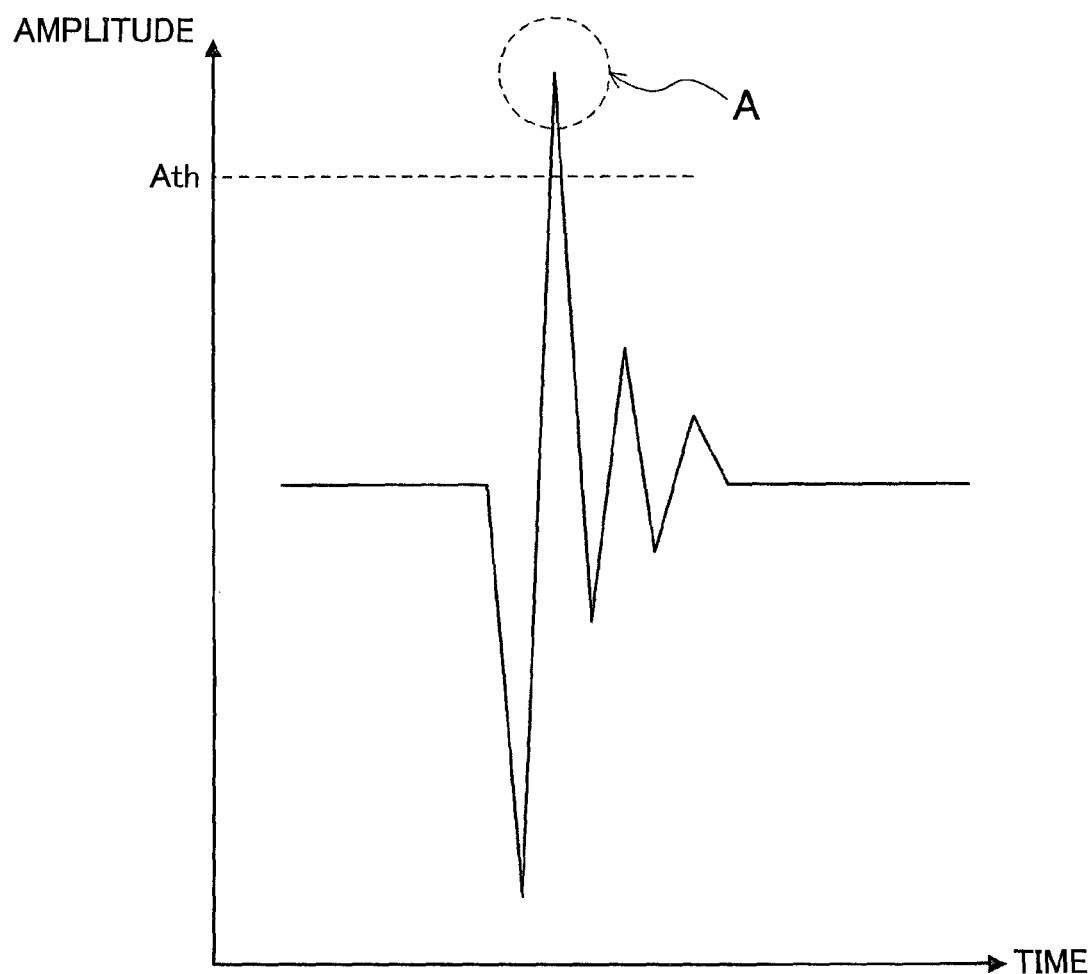
FIG. 6A and FIG. 6B are charts that illustrate vibration waveforms that are detected by a vibration sensor according to the second embodiment.
Figure 6B:
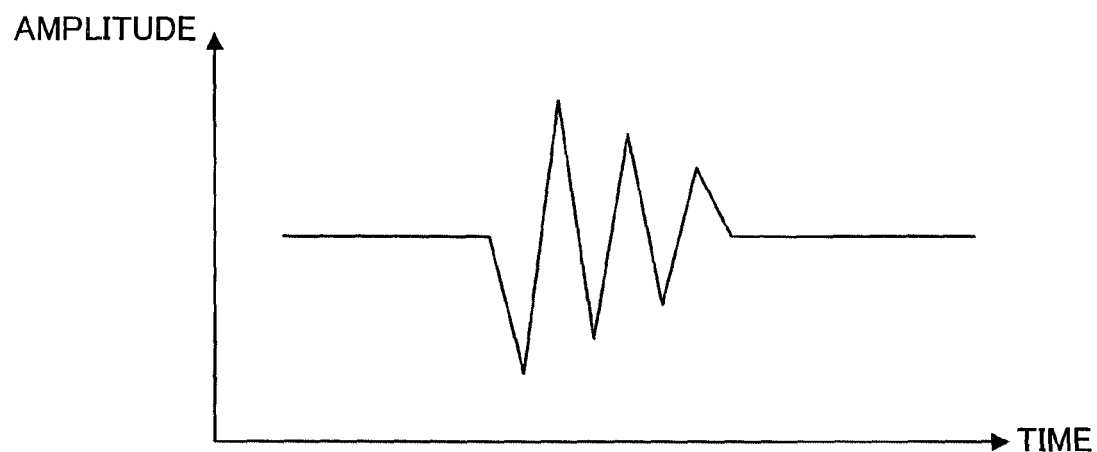

That is, the vibration value that is detected by the vibration sensor 602 changes with the hardness of the object A. Specifically, when the hardness of the object A is high, the vibration sensor 602 detects the vibration value indicating that the vibration is large as shown in FIG. 6A. At this time, the vibration sensor 602 transmits a vibration waveform, in which a peak amplitude that exceeds an amplitude threshold Ath rises as indicated by the arrow A in FIG. 6A, to the control device 610. On the other hand, when the hardness of the object A is low, the vibration sensor 602 detects the vibration value indicating that the vibration is small as shown in FIG. 6B. At this time; the vibration sensor 602 transmits a vibration waveform, in which there is no peak amplitude that exceeds the amplitude threshold Ath as shown in FIG. 6B, to the control device 610.

The control device 610 corresponds to the control device 5 shown in FIG. 1. The control device 610, as well as the control device 500 according to the first embodiment, may be, for example, formed of hardware, such as a relay circuit that executes sequence control or may be, for example, formed of a computer. The control device 610, as well as the control device 500, determines whether the object A between the movable electrode 220 and the fixed electrode 300 is a welding target. That is, the Control device 610 determines whether the vibration of the fixed electrode 300 increases at the time when the object A is brought into contact with the movable electrode 220 and the fixed electrode 300 with the use of the vibration sensor 602. In addition, the control device 610 controls whether to carry out welding on the object A sandwiched between the movable electrode 220 and the fixed electrode 300 on the basis of the determined result. Specifically, description will be made later with reference to FIG. 7.

Figure 7:
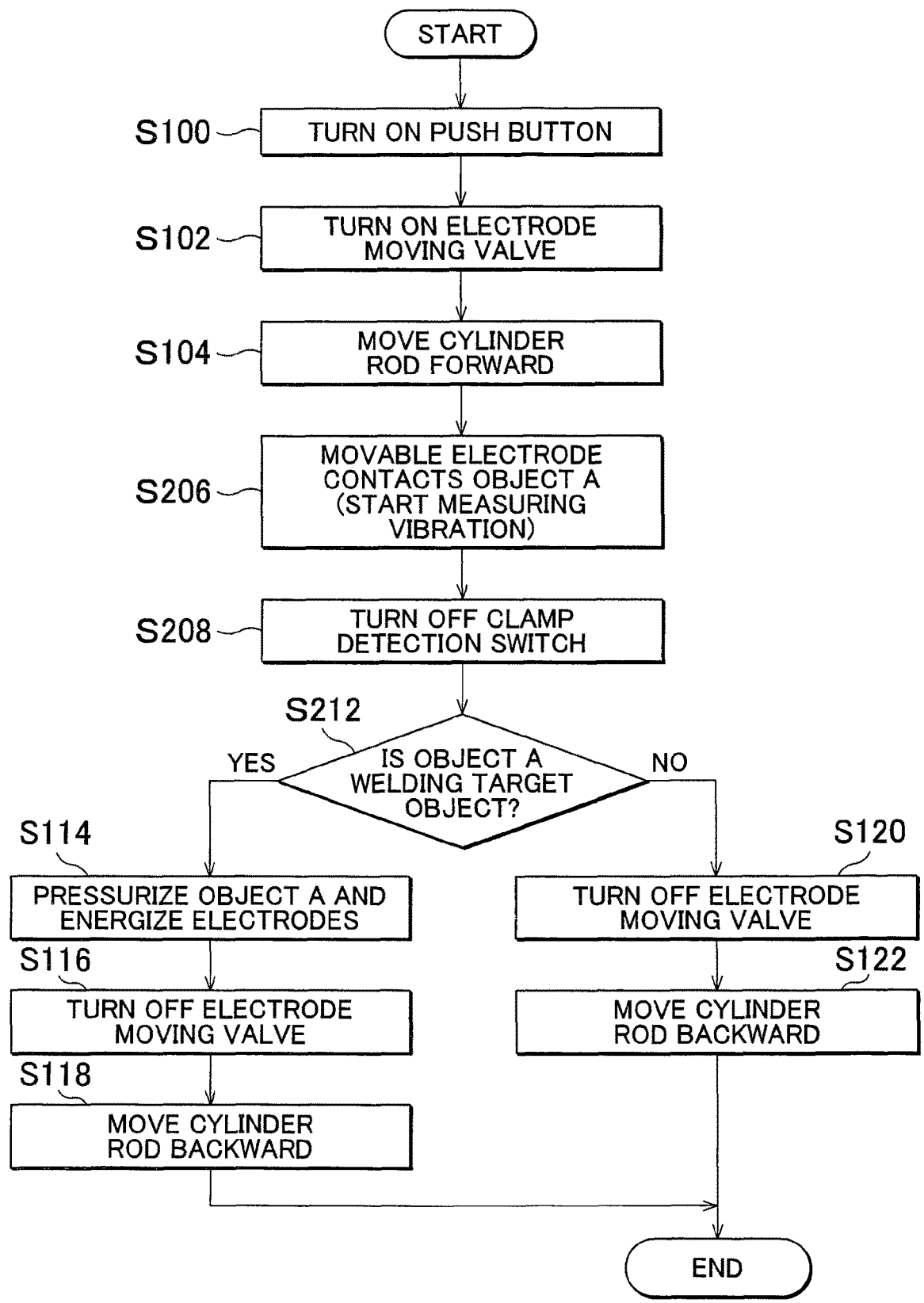
FIG. 7 is a flowchart that shows the overall processes of the welding device according to the second embodiment.

FIG. 7 is a flowchart that shows the overall processes of the welding device 600. In the flowchart shown in FIG. 7, the sequence of the processes (steps) may be changed as needed. One or more of the plurality of processes (steps) may be omitted. Like step numbers denote substantially similar processes to the processes of FIG. 3, and the description is omitted.

When the cylinder rod 108 moves forward, the movable electrode 220 contacts the object A as in the case of FIG. 4A (S206). At this time, a vibration propagates to the fixed electrode 300 because of contact of the movable electrode 220 with the object A. Therefore, the vibration sensor 602 detects a vibration. When the vibration sensor 602 has detected a vibration, the control device 610 receives a detected signal (vibration information) from the vibration sensor 602, and stores the detected signal. Specifically, the control device 610 receives a vibration waveform as illustrated in FIG. 6, and stores the information. In addition, when the cylinder rod 108 moves forward, the elastic member 216 is compressed, the dog 232 moves away from the clamp detection switch 230 as in the case of FIG. 4B, and the clamp detection switch 230 turns off (S208).

When the clamp detection switch 230 turns off, the control device 610 determines whether the object A is a welding target (S212). Specifically, the control device 610 determines whether the detected signal (vibration information) from the vibration sensor 602 indicates a vibration value having a predetermined magnitude. In addition, specifically, the control device 610 determines whether there is a peak amplitude that exceeds the amplitude threshold Ath in the vibration waveform obtained from the detected signal transmitted from the vibration sensor 602.

By executing the process of S212 after the process of S208, it is possible to execute the above-described determination process even when almost no vibration is detected because the hardness of the object A is considerably low. That is, when determination is started as the vibration sensor 602 has detected a vibration, and when almost no vibration is detected because of a considerably low hardness of the object A, there is no trigger for starting determination, so it is not possible to start determination. On the other hand, by executing the process of S212 after the process of S208, a trigger (turning off the clamp detection switch 230) for starting determination is reliably present, so it is possible to start determination.

When there is a peak amplitude that exceeds the amplitude threshold Ath in the vibration waveform, that is, when the detected signal (vibration information) from the vibration sensor 602 indicates the vibration value having the predetermined magnitude, the control device 610 determines that the object A is a welding target (YES in S212). In this case, as described above, welding is carried out on the object A in S114. On the other hand, when there is no peak amplitude that exceeds the amplitude threshold Ath in the vibration waveform, that is, when the detected signal (vibration information) from the vibration sensor 602 does not indicate the vibration value having the predetermined magnitude, the control device 610 determines that the object A is not a welding target (NO in S212). In this case, as described above, welding is not carried out on the object A. In this way, it is possible to determine whether the object with which the movable electrode 220 contacts is a welding target by a simple method, that is, measuring a vibration of the fixed electrode 300.

Comparative Embodiment

Figure 8:
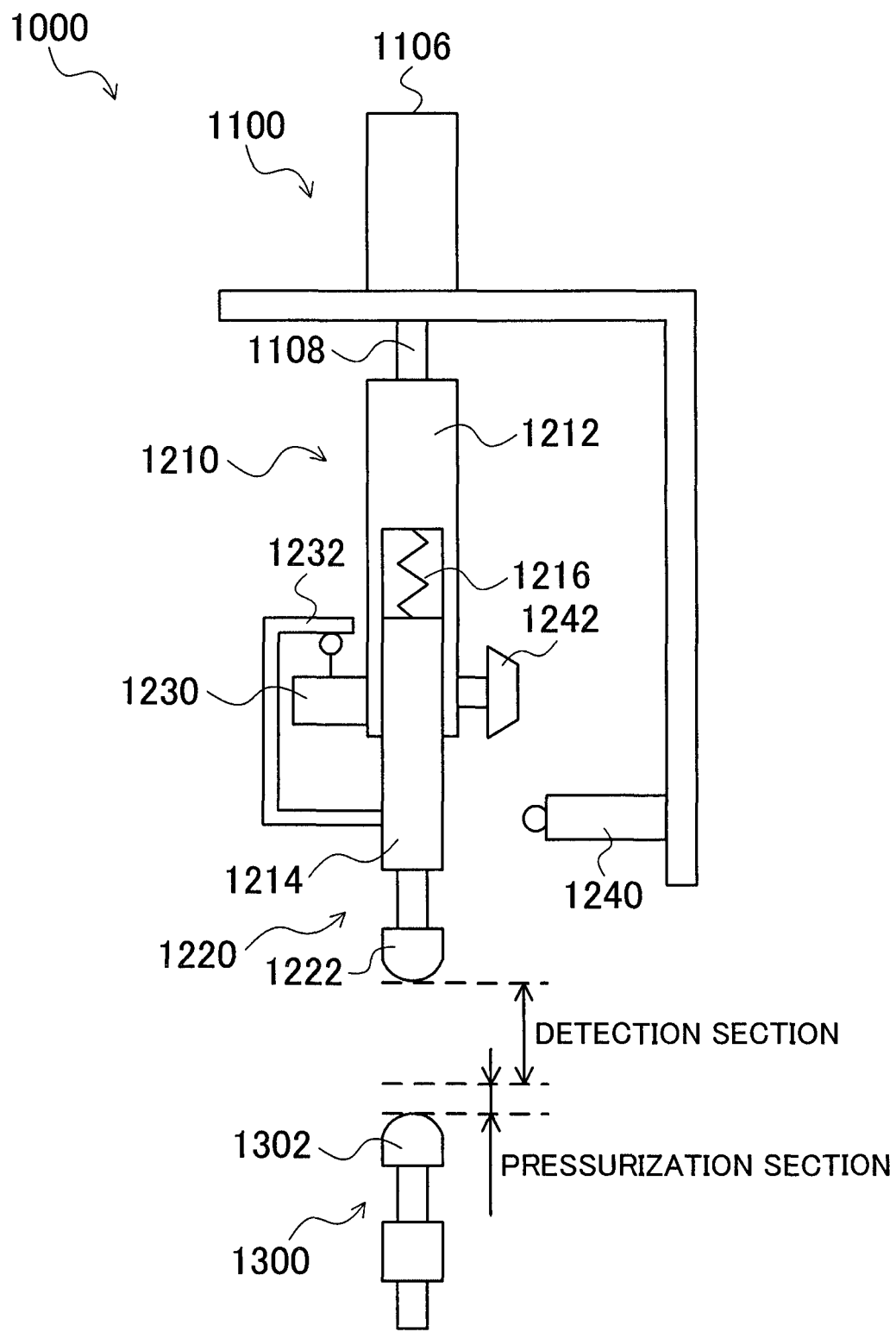
FIG. 8 is a view that shows a welding device according to a comparative embodiment of the invention.

Next, a comparative embodiment that is compared with the first embodiment will be described. FIG. 8 is a view that shows a welding device 1000 according to the comparative embodiment. The welding device 1000 includes an actuating device 1100, a telescopic rod 1210, a movable electrode 1220 and a fixed electrode 1300. The welding device 1000 is configured to detect whether a non-welding target is caught in between the electrodes on the basis of a displacement of the electrodes.

The actuating device 1100, as well as the actuating device 100, moves the movable electrode 1220 up and down via the telescopic rod 1210. The actuating device 1100 includes a cylinder 1106 and a cylinder rod 1108. When fluid, such as oil and air, is supplied to the cylinder 1106, the cylinder rod 1108 moves forward.

The telescopic rod 1210, as well as the telescopic rod 210, includes a cylinder portion 1212 and a rod portion 1214, having a telescopic structure. The cylinder rod 1108 is connected to an end portion of the cylinder portion 1212 across from the rod portion 1214. The rod portion 1214 is connected to the inside of the cylinder portion 1212 via an elastic member 1216. When the elastic member 1216 extends or contracts, the telescopic rod 1210 extends or contracts. The elastic member 1216, as well as the elastic member 216, is, for example, formed of spring, rubber, or the like.

The movable electrode 1220 is connected to an end portion of the rod portion 1214 across from the cylinder portion 1212. A welding tip 1222 is provided at the distal end of the movable electrode 1220. The fixed electrode 1300 is provided at a location facing the movable electrode 1220. A welding tip 1302 is provided at the distal end of the fixed electrode 1300. Each of the welding tip 1222 and the welding tip 1302 is replaceable when the welding tip 1222 or the welding tip 1302 has abraded due to repeated welding.

A detection switch 1230 is provided on the side face of the cylinder portion 1212. The detection switch 1230 is a switch for detecting the fact that foreign matter contacts the movable electrode 1220 and the fixed electrode 1300 therebetween. A dog 1232 is provided on the side face of the rod portion 1214. The dog 1232 is formed in a substantially C shape. As in the case of the first embodiment, when the elastic member 1216 is extended under the own weight of the rod portion 1214, the dog 1232 turns on the detection switch 1230.

As shown in FIG. 9A, when the movable electrode 1220 contacts foreign matter (for example, a non-welding target, such as a finger of a worker) in a detection section provided between the movable electrode 1220 and the fixed electrode 1300, the telescopic rod 1210 contracts. As a result, the dog 1232 moves away from the detection switch 1230. As a result, the detection switch 1230 turns off. When the detection switch 1230 turns off, control is executed such that fluid supplied to the cylinder 1106 is drained. As a result, the cylinder rod 1108 moves backward. Thus, the movable electrode 1220 also goes up, and the movable electrode 1220 moves away from the foreign matter.

A dog 1242 is further provided on the side face of the cylinder portion 1212. The dog 1242 is a member for turning on a pressurization switch 1240. As shown in FIG. 9B, the dog 1242 is configured to turn on the pressurization switch 1240 when the movable electrode 1220 does not contact foreign matter in the detection section and the distal end of the movable electrode 1220 goes down to the lower end of the detection section. When the pressurization switch 1240 turns on, control is executed such that the fluid supplied to the cylinder 1106 is not drained even when the detection switch 1230 turns off.

Thus, as shown in FIG. 9C, even when the movable electrode 1220 contacts a welding target in the pressurization section provided below the detection section and the dog 1232 moves away from the detection switch 1230, the movable electrode 1220 does not go up. At this time, as shown in FIG. 9D, the cylinder rod 1108 further moves forward. As a result, the elastic member 1216 is further compressed, so the movable electrode 1220 is pressed against the welding target by the urging force of the elastic member 1216. Thus, the movable electrode 1220 pressurizes the welding target. The above-described pressurization section may be determined by adjusting the position of the pressurization switch 1240 and the position of the dog 1242, and may be, for example, determined so as to correspond to the thickness of the welding target, such as steel sheets.

When a pressurization time reaches a predetermined period, a power supply (not shown) energizes the movable electrode 1220 and the fixed electrode 1300, thus carrying out welding on the welding target. When welding is complete, the fluid supplied to the cylinder 1106 is drained from the cylinder 1106, so the cylinder rod 1108 moves backward. Accordingly, the movable electrode 1220 moves away from the welding target, and the welding process ends.

As described above, when welding is repeated, the welding tip 1222 of the movable electrode 1220 and the welding tip 1302 of the fixed electrode 1300 abrade. In such a case, the welding tips 1222, 1302 may be removed, ground, and then mounted again. As a result, as shown in FIG. 10A, the length of the welding tip 1222 of the movable electrode 1220 and the length of the welding tip 1302 of the fixed electrode 1300 each become small.

It is assumed that the movable electrode 1220 goes down in this state and then the dog 1242 turns on the pressurization switch 1240 as shown in FIG. 10B. In this case, the clearance between the distal end of the movable electrode 1220 and the distal end of the fixed electrode 1300 is longer than that in the case of the initially set pressurization section. That is, at this time, even when there is a welding target between the movable electrode 1220 and the fixed electrode 1300, a gap may occur. In other words, there is room for allowing a non-welding target, such as a finger of a worker, to be inserted between the movable electrode 1220 and the welding target.

In this state, when the non-welding target has been caught in between the movable electrode 1220 and the welding target, because the dog 1242 has turned on the pressurization switch 1240, the movable electrode 1220 does not go up even when the movable electrode 1220 contacts the non-welding target and, as a result, the detection switch 1230 turns off. Thus, unless the position of the pressurization switch 1240 and the position of the dog 1242 are adjusted or the welding tips 1222, 1302 are replaced, the movable electrode 1220 continues pressing a non-welding target even when the non-welding target has been caught in between the movable electrode 1220 and the welding target.

On the other hand, the welding device 10 according to the outline of the embodiment detects whether the object A sandwiched between the movable electrode 220 and the fixed electrode 300 is a welding target not on the basis of the position (displacement) of the electrodes. Thus, even when the welding tips 222, 302 abrade and become short, it is possible to further reliably determine whether the object sandwiched between the movable electrode 220 and the fixed electrode 300 is a welding target in comparison with the welding device 1000 according to the comparative embodiment. In addition, it is possible to cancel the welding process when the object is a non-welding target, and it is possible to continue the welding process when the object is a welding target.

Alternative Embodiment

The invention is not limited to the above-described embodiment; the embodiment may be modified as needed without departing from the scope of the invention as follows.

As described above, in the flowchart shown in FIG. 3, the sequence of the processes (steps) may be changed as needed. One or more of the plurality of processes (steps) may be omitted. For example, the process of S110 may be executed before S106. In other words, the power supply 400 may start applying the object detection voltage before the movable electrode 220 contacts the object A. In this case, the control device 500 may determine whether the object A is a welding target (whether the object A is a conductor or an insulator) when the movable electrode 220 has contacted the object A. Here, the fact that the movable electrode 220 has contacted the object A may be detected by, for example, detecting fluctuations in the measured value of the voltmeter 450. With the above sequence, it is possible to reduce a period of time of the welding process or it is possible to reduce a period of time up to a cancellation of the welding process. In this case, when it is determined that the object A is not a welding target, the process of S108 may be skipped, and the cylinder rod 108 may be immediately moved backward. Thus, it is possible to prevent application of excessive pressure to a non-welding target.

In the above-described first embodiment, the power supply that applies the welding voltage also applies the object detection voltage. Instead, another power supply for applying the object detection voltage may be prepared separately in addition to the power supply for applying the welding voltage. By separately preparing the power supply in this way, a power supply for applying the object detection voltage to the existing welding device may also be installed when the control device is retrofitted.

In the above-described first embodiment, in order to, determine whether electrical conduction is established between the two electrodes when an object is sandwiched between the two electrodes, the potential difference between the two electrodes is measured. Instead, another method may be employed as long as it is possible to determine the electrical conduction state of the object. For example, the resistance value of the object may be measured or a current value flowing through the object may be measured. In the above-described first embodiment, only the movable electrode 220 disposed on the upper side moves up and down and the fixed electrode 300 disposed on the lower side does not move. Instead, it, is also applicable that the upper electrode is fixed and the lower electrode is moved. Alternatively, it is also applicable that both the electrodes are movable.

As described above, in the flowchart shown in FIG. 7 as well, the sequence of the processes (steps) may be changed as needed. One or more of the plurality of processes (steps) may be omitted. For example, the process of S212 may be executed before S208. In other words, when the fixed electrode 300 vibrates because of contact of the movable electrode 220 with the object A and then the vibration sensor 602 has detected the vibration, the control device 610 may immediately determine whether the object A is a welding target. With the above sequence, it is possible to reduce a period of time of the welding process or it is possible to reduce a period of time up to a cancellation of the welding process. In this case, when it is determined that the object A is not a welding target, the process of S208 may be skipped, and the cylinder rod 108 may be immediately moved backward. Thus, it is possible to prevent application of excessive pressure to a non-welding target.

In the above-described second embodiment, whether the object A is a welding target is determined on the basis of whether there is a peak amplitude that exceeds the amplitude threshold Ath in the vibration waveform; however, the invention is not limited to this configuration. For example, whether the object A is a welding target may be determined on the basis of the frequency of the vibration waveform. At this time, for example, it may be determined that the object A is a welding target (the object A is made of a hard material) when the frequency of the vibration waveform is high, and may be determined that the object A is not a welding target when the frequency of the vibration waveform is low. A method of detecting the information that varies with the hardness of the object A is to detect a vibration of the fixed electrode 300 at the time when the movable electrode 220 contacts the object A. However, any method may be used as long as the method is to detect the information that varies with the hardness of the object A. For example, an impact force that is applied to the movable electrode 220 or the fixed electrode 300 at the time when the movable electrode 220 contacts the object A may be detected. At this time, for example, it may be determined that the object A is a welding target (made of a hard material) when the impact force is large, and may be determined that the object A is not a welding target when the impact force is small. For example, a Vickers hardness may be detected with the use of the movable electrode 220.

What is claimed is:

1. A welding method that uses a welding device that has a movable first electrode and a fixed second electrode that are configured to carry out welding in cooperation with each other by applying a welding voltage between the first electrode and the second electrode, the welding method comprising:
   detecting vibration information with a vibration detecting unit installed near the second electrode, the vibration information varying with a material of a object in a state where the object is in contact with the first electrode and the second electrode; determining whether the object is a welding target based on the detected vibration information; determining whether the object is a hand or finger based on the detected vibration information; controlling whether to initiate welding on the object by applying the welding voltage based on the determination that the object is a welding target; and controlling whether to not-initiate welding on the object based on the determination that the object is not a welding target.

2. A welding device comprising:
   a movable first electrode and a fixed second electrode that are configured to carry out welding in, cooperation with each other by applying a welding voltage between the first electrode and the second electrode; a vibration detecting unit installed near the second electrode and configured to detect vibration information in a state where the first electrode and the second electrode are in contact with a object, a control device configured to perform the following: determine whether the object is a welding target based on the detected vibration information; determine whether the object is a hand or finger based on the detected vibration information; control whether to initiate welding on the object based on the determination of whether the object is a welding target; and control whether to not-initiate welding on the object based on the determination that the object is a hand or finger.

* * * * *